Feb. 11, 1930.   S. I. LEVY   1,746,313
TREATMENT OF COPPER RICH MATERIAL
Filed March 1, 1928
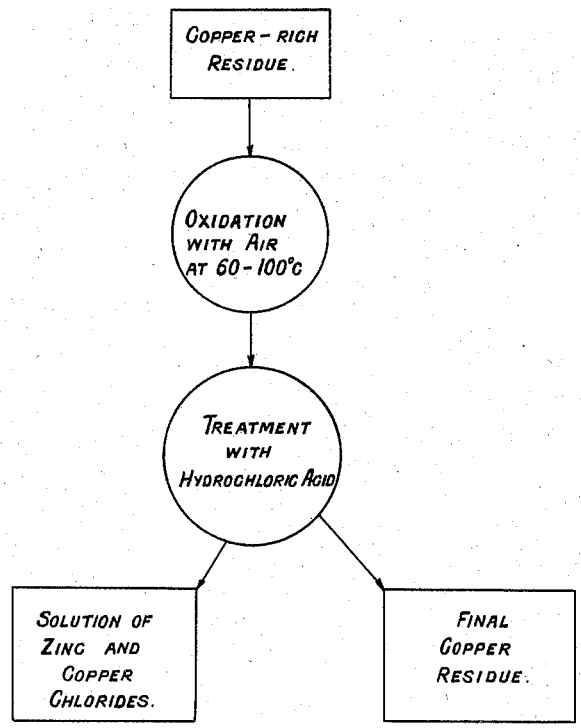

Patented Feb. 11, 1930

1,746,313

UNITED STATES PATENT OFFICE

STANLEY ISAAC LEVY, OF LONDON, ENGLAND

TREATMENT OF COPPER-RICH MATERIAL

Application filed March 1, 1928, Serial No. 258,439, and in Great Britain February 10, 1928.

This invention relates to the treatment of copper-rich residues obtained in the treatment of iron pyrites for the recovery therefrom of the metals and also, if desired, of the sulphur.

In the specification of a co-pending application Serial No. 259,317 for patent I have described a process of obtaining crude sulphur and pure sulphur by heating the pyrites in the absence of air leaving a "mainly soluble" residue and then reacting on the "mainly soluble" residue with hydrochloric acid. As a result of such reactions ferrous chloride and lead chloride pass into solution and sulphuretted hydrogen is evolved.

The residue from the treatment with hydrochloric acid solution of the "mainly soluble" residue contains sulphides of iron, copper and zinc, together with some free sulphur and all the insoluble siliceous matter from the original pyrites and is hereinafter referred to as the copper-rich residue. This residue may be smelted directly for copper, but the other valuable elements are lost in this case.

In accordance with the present invention the various steps of which are illustrated in the accompanying flow sheet, the copper-rich residue is subjected to an oxidizing treatment with air as a result of which the subsequent operations are facilitated.

If this copper-rich residue be exposed freely to the air at a temperature of 60–100° C. as for example by passing through an ordinary cylindrical drier heated by waste gases, it suffers such a change that on treatment with hydrochloric acid the whole of the zinc and most of the iron go into solution. The residue after filtering and washing is only about half what it was prior to the treatment, but still contains the whole of the copper, the proportion of which is thus doubled. This final residue thus contains 16–20% of copper, and is very easily worked up for the recovery of the metal.

The acid solution obtained by treatment of the oxidized residue with hydrochloric acid may be employed in the cycle described in the specification of my co-pending application for patent Serial No. 259,317, by adding it to the reaction vessel in which the "mainly soluble" residue is treated with hydrochloric acid. This solution now contains all the zinc which would otherwise have been lost in the residue. This zinc may be subsequently recovered as described in the specification of my co-pending application for patent Serial No. 257,091.

I claim—

1. The process of recovering copper concentrates from "copper-rich" residues obtained in the treatment of pyrites, consisting in exposing the "copper-rich" residue to air at a temperature of 60 to 100° C., and reacting on the residue thus treated with hydrochloric acid.

2. The process of recovering copper concentrates from "copper-rich" residues obtained in the treatment of pyrites, consisting in exposing the "copper-rich" residue to air at a temperature of 60 to 100° C., reacting on the residue thus treated with hydrochloric acid and mixing the chloride solution obtained with other chloride solutions containing iron and zinc to recover the zinc in the solution.

In testimony whereof I have signed my name to this specification.

STANLEY ISAAC LEVY.